Nov. 8, 1949     H. P. PHILLIPS     2,487,587
APPARATUS FOR MANUFACTURING PISTON RING ELEMENTS
Original Filed May 11, 1944
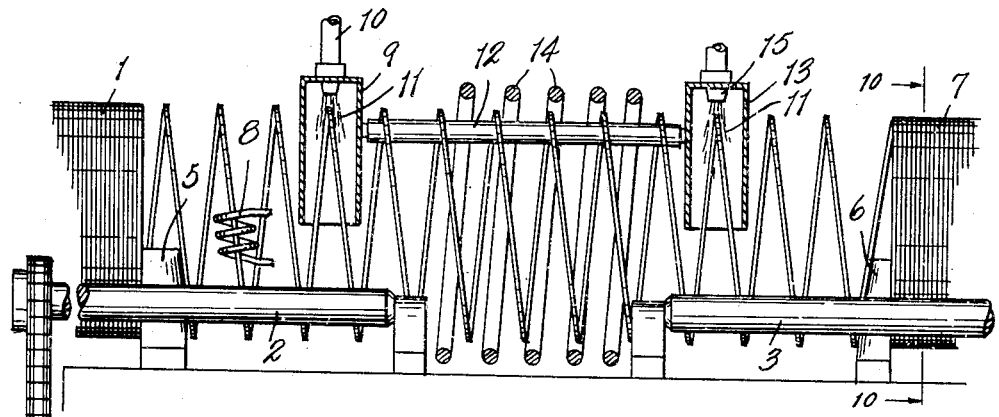
FIG. 1
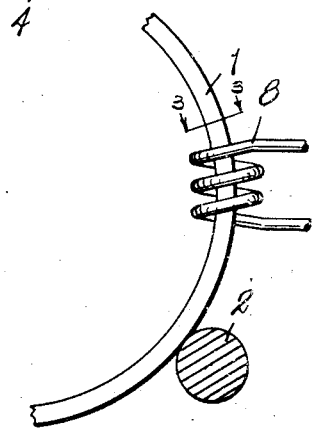
FIG. 2
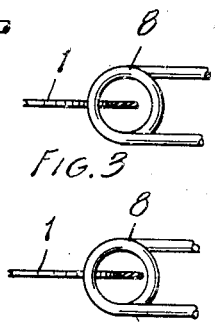
FIG. 3
FIG. 4
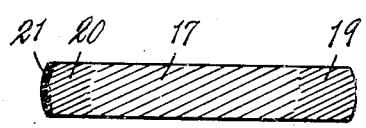
FIG. 6
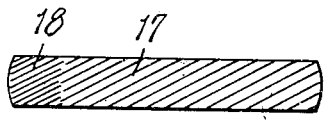
FIG. 7
FIG. 8
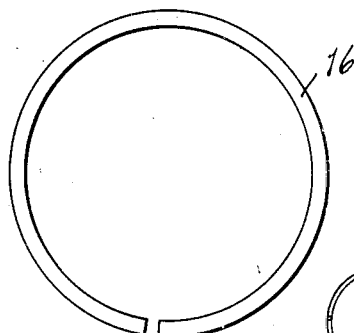
FIG. 5
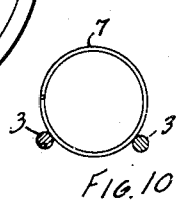
FIG. 9
FIG. 10
INVENTOR.
HAROLD P. PHILLIPS
BY
Earl D. Chappell
ATTORNEYS.

Patented Nov. 8, 1949

2,487,587

UNITED STATES PATENT OFFICE 2,487,587

APPARATUS FOR MANUFACTURING PISTON RING ELEMENTS

Harold P. Phillips, Hastings, Mich., assignor to Hastings Manufacturing Company, Hastings, Mich., a corporation of Michigan Original application May 11, 1944, Serial No. 535,046. Divided and this application April 2, 1945, Serial No. 586,153

10 Claims. (Cl. 266—4)

1

This application is a division of my application for Letters Patent, Serial No. 535,046, filed May 11, 1944.

The main objects of this invention are:

First, to provide an apparatus for use in the manufacture of piston ring elements in which the ring elements are formed of ribbon steel coiled edgewise and provided with a hardened wear-resisting portion on one or both edges and in certain forms softening or annealing shallow portions to facilitate wearing-in of the ring elements.

Second, to provide an apparatus for this purpose which is of large capacity and mainly automatic in its operation and one which is adapted to produce a very uniform product.

Objects relating to details and economies of the invention will appear from the description to follow. The invention is defined and pointed out in the claims.

A preferred embodiment of the invention is illustrated in the accompanying drawing, in which:

Fig. 1 is a fragmentary view partially in elevation and partially in longitudinal section of an apparatus embodying my invention, certain of the parts being shown mainly in conventional form and no attempt being made to show the parts in exact proportions.

Fig. 2 is an enlarged fragmentary view illustrating an induction heating coil for heating one or both edges of the element to tempering temperature.

Fig. 3 is a fragmentary section on line 3—3 of Fig. 2 showing the heating coil associated with the work to heat both edges thereof.

Fig. 4 is a view similar to that of Fig. 3 with the heating coil adjusted to heat the outer edge only of the work to tempering heat.

Fig. 5 is a side elevation of a ring element illustrating the general character of the element without, however, any attempt to show the hardened edges.

Fig. 6 is an enlarged fragmentary section through one of the ring elements or of the coil from which it is formed with both inner and outer edges hardened.

Fig. 7 is a view corresponding to that of Fig. 6 with the outer hardened edge annealed providing a relatively soft surface facilitating the wearing-in of the ring element.

Fig. 8 is a sectional view through the ring element or the coil from which it is formed with the outer edge only hardened.

Fig. 9 is a view corresponding to that of Fig. 8 in which the outer edge is provided with an annealed relatively soft wear-in surface facilitating quick wearing-in.

Fig. 10 is a section on line 10—10 of Fig. 1, on a reduced scale showing the coil of ribbon steel in relation to one of the pairs of supporting rollers therefor.

Referring to the accompanying drawing, 1 represents a multiple spiral coil of ribbon steel coiled edgewise, the individual coils of which are of substantially uniform diameter and lie in side by side contacting relation. This coil is supported in a pair of front or delivery rollers 2, only one of which is illustrated, at least one of these rollers 2 being driven as indicated at 4.

A second pair of rear or receiving rollers 3 are spaced longitudinally of the machine from the rollers 2, the second pair of rollers being adapted to support the coil 7 after the same has been tempered. The pair of rollers 2 are disposed relative to the coil of ribbon steel as are the pair of rollers 3 shown in Fig. 10.

The abutment 5 is associated with the first coil stock 1 to permit in separation of the coils between this abutment and the abutment 6 associated with the second pair of rollers to restrain the coil 7.

The coils of the multiple coil stock are extended axially or separated between these abutments and when the delivery coil 1 is rotated, receiving coil 7 is also rotated, and the spiral constituted by the several spaced coils is rotated and advanced.

I provide an induction heater 8 which is supported so that the spiral strip passes therethrough and as the strip is rotated the portions of the spiral are successively brought into the heater and the strip heated on one or both edges depending on the position of the heater element to the strip. For example, as shown in Figs. 2 and 3, the heater is positioned so that the coil is centrally located relative thereto and both edges of the work are heated uniformly while in Fig. 4 the heater is positioned so that only one edge of the strip or work is brought to heating temperature. The capacity of the heater and the rate of feed is such that the edge or edges of the spiral strip are brought to hardening temperature.

From the heater, the coils of the spiral are passed into the downwardly opening quenching chamber 9 which has a spray nozzle 10 associated therewith for discharging a tempering medium 11 upon the heated work to effectively harden the same. It will be noted that both the first heater 8 and the quenching unit are arranged to act on the work while it is supported by the first set of rollers 2.

At the rear of the first quenching unit, the spirals of the work are passed over the supporting rod 12 which extends between the housing 9 of the first tempering unit and the housing 13 of the second tempering unit. While the work is supported by the supporting rod 12, it is passed axially through the second induction heater 14 which is of such capacity as to anneal the outer edge of the previously hardened portion of the work. The rear ends of the front rollers 2 are axially spaced from the front ends of the rear rollers 3 and the induction heater coil 14 is disposed between said axially spaced ends to facilitate disposition of this induction coil closely adjacent the multiple coil spiral 1 being treated. As will be seen in Fig. 1, the axis of the induction coil 14 is substantially parallel and substantially coincident with the axis of the multiple coil spiral 1, and the coils of the induction coils are disposed radially spaced from but closely adjacent the coils of the multiple coil spiral. This relative arrangement of these coils facilitates heat treatment of only the peripheral portion of the coil spiral. From this second heater or annealing heater 14, the work is passed to the quenching chamber 13 which is provided with a spray head 15 for the tempering medium 11. The work passes from the second tempering unit to the coil 7 and this multiple coil spiral with the treated edges is then cut into ring elements 16.

Figs. 6, 7, 8 and 9 are sectional views through the ring elements. In Fig. 6, the ring element 17 is provided with a hardened outer edge 18 and hardened inner edge 19. In Fig. 7, the hardened outer edge 20 is provided with an annealed or relatively soft quick wear-in surface 21. In Fig. 8, the ring element is provided with a hardened surface 18 on its outer edge only. The embodiment of Fig. 9 is the same as that of Fig. 7 except that the inner edge is not hardened.

The ribbon steel is of a character that it may be coiled edgewise and may desirably be from 300 to 500 Brinell test or from 40 to 50 Rockwell test. The tempered portion is preferably from 700 to 900 Brinell test and corresponding generally to 60 or 70 Rockwell test. The hardened portion is preferably in the neighborhood of the order of $\frac{1}{32}$ of an inch in depth although it may vary from $\frac{1}{64}$ of an inch in either direction. The annealed portion or surface is preferably about .003 of an inch in depth although it may vary in the order of from .002 to .004 of an inch. While I prefer to employ induction heaters inasmuch as such heaters may be very effectively controlled and regulated, other forms of heating means might be employed. I have shown the induction heaters and other parts conventionally as the structural details thereof form no part of this invention.

I have not attempted to illustrate various modifications in the apparatus or other apparatus for practicing my invention as it is believed that this disclosure will enable those skilled in the art to embody or adapt my invention as may be desired.

Having thus described my invention, what I claim as new and desire to secure by Letters Patent is:

1. An apparatus of the class described comprising front and rear axially spaced sets of parallel rollers adapted to rotatably support a multiple coil spiral of ribbon steel coiled edgewise, at least one of the rollers of the front set being driven, abutments associated with said front and rear sets of rollers, the front abutment successively discharging the coils of the multiple coil spiral as it is rotated, the second abutment maintaining the discharged spirals in separated spiral strip relation as they are advanced, a first induction heater through which the advancing spiral strip is passed while the spirals thereof are supported by the front set of rollers, a quenching means disposed at the rear of said induction heater to successively receive the spirals passing from the first induction heater while they are supported by the first set of rollers and comprising a downwardly facing housing successively receiving the spirals as they are advanced from said first induction heater and a spray discharging within the housing, a supporting rod for the spirals disposed at the rear of said first quenching means, an induction heater coil through which the spirals are axially passed while supported by said supporting rod, and a second quenching means at the rear of said second induction heater and comprising a downwardly facing housing successively receiving the spirals as they are advanced from said second induction heater and a spray discharging within said housing, the spirals being supported by said rear rollers as they are advanced through said second quenching means.

2. An apparatus of the class described comprising front and rear axially spaced sets of parallel rollers adapted to rotatably support a multiple coil spiral of ribbon steel coiled edgewise, at least one of the rollers of the front set being driven, abutments associated with said front and rear sets of rollers, the front abutment successively discharging the coils of the multiple coil spiral as it is rotated, the second abutment maintaining the discharged spirals in separated spiraled strip relation as they are advanced, a first induction heater through which the advancing spiral strip is passed while the spirals thereof are supported by the front set of rollers, a quenching means disposed at the rear of said induction heater to successively receive the spirals passing from the first induction heater while they are supported by the first set of rollers, a supporting rod for the spirals disposed at the rear of said first quenching means, an induction heater coil through which the spirals are axially passed while supported by said supporting rod, and a second quenching means at the rear of said second induction heater.

3. An apparatus of the class described comprising front and rear axially spaced sets of parallel rollers adapted to rotatably support a multiple coil spiral of ribbon steel coiled edgewise, the rollers of each set being elongated to support thereon a plurality of coils of the multiple coil spiral in side by side abutting relation, the sets of rollers being disposed to permit the portion of the multiple coil spiral supported on the front set of rollers to be substantially axially aligned with that portion supported on the rear set of rollers, the rear ends of the front set of rollers being axially spaced a substantial distance from the front ends of the rear set of rollers to facilitate treatment of the multiple coil spiral between the front and rear sets of rollers as the multiple coil spiral is passing from the front set of rollers to the rear set of rollers, the multiple coil spiral supporting surface of the rollers being substantially continuous to facilitate engagement thereof with successive spirals, at least one of the rollers of the front set being driven, abutments associated with said front and rear sets of rollers, the front abutment successively discharging the coils of the multiple coil spiral as it is rotated, the second abutment maintaining the discharged spirals in separated spiraled strip relation as they are advanced, a heater through which the advancing spiraled strip is passed, said heater being disposed to heat the multiple coil spiral between the axially spaced ends of said sets of rollers, a quenching means disposed at the rear of said heater to successively receive the spirals passing from the heater while they are supported by the first set of rollers and comprising a downwardly facing housing successively receiving the spirals as they are advanced from said heater and a spray discharging within the housing, both the heater and the quenching means being disposed to heat and quench the multiple coil spiral where the spirals thereof are maintained in separated relation by said abutments.

4. An apparatus of the class described comprising front and rear axially spaced sets of parallel rollers adapted to rotatably support a multiple coil spiral of ribbon steel coiled edgewise, the rollers of each set being elongated to support thereon a plurality of coils of the multiple coil spiral in side by side abutting relation, the sets of rollers being disposed to permit the portion of the multiple coil spiral supported on the front set of rollers to be substantially axially aligned with that portion supported on the rear set of rollers, the rear ends of the front set of rollers being axially spaced a substantial distance from the front ends of the rear set of rollers to facilitate treatment of the multiple coil spiral between the front and rear sets of rollers as the multiple coil spiral is passing from the front set of rollers to the rear set of rollers, the multiple coil spiral supporting surface of the rollers being substantially continuous to facilitate engagement thereof with successive spirals, at least one of the rollers of the front set being driven, abutments associated with said front and rear sets of rollers, the front abutment successively discharging the coils of the multiple coil spiral as it is rotated, the second abutment maintaining the discharged spirals in separated spiraled strip relation as they are advanced, a heater through which the advancing spiraled strip is passed, said heater being disposed to heat the multiple coil spiral between the axially spaced ends of said sets of rollers, a quenching means disposed at the rear of said heater to successively receive the spirals passing from the heater and comprising a downwardly facing housing successively receiving the spirals as they are advanced from said heater and a spray discharging within the housing, the quenching means being disposed to quench the multiple coil spiral between said abutments where the spirals are maintained in separated relation to facilitate passage of the quenching medium between the spirals.

5. An apparatus of the class described comprising front and rear axially spaced sets of parallel rollers adapted to rotatably support a multiple coil spiral, at least one of the rollers of the front set being driven, abutments associated with said front and rear sets of rollers, the front abutment successively discharging the coils of the multiple coil spiral as it is rotated, the second abutment maintaining the discharged spirals in separated spiraled strip relation as they are advanced, a first heater through which the advancing spiraled strip is passed, a quenching means disposed at the rear of said first heater to successively receive the spirals passing from the first heater, a supporting means for the spirals disposed at the rear of said first quenching means, a second heater through which the spirals are passed while supported by said supporting means, and a second quenching means at the rear of said second heater.

6. An apparatus of the class described comprising front and rear axially spaced sets of parallel rollers adapted to rotatably support a multiple coil spiral, the rollers of each set being elongated to support thereon a plurality of coils of the multiple coil spiral in side by side abutting relation, the sets of rollers being disposed to permit the portion of the multiple coil spiral supported on the front set of rollers to be substantially axially aligned with that portion supported on the rear set of rollers, the rear ends of the front set of rollers being axially spaced a substantial distance from the front ends of the rear set of rollers to facilitate treatment of the multiple coil spiral between the front and rear sets of rollers as the multiple coil spiral is passing from the front set of rollers to the rear set of rollers, at least one of the rollers of the front set being driven, abutments associated with said front and rear sets of rollers, the front abutment successively discharging the coils of the multiple coil spiral as it is rotated, the second abutment maintaining the discharged spirals in separated spiraled strip relation as they are advanced, a heater through which the advancing spiraled strip is passed, and a quenching means disposed at the rear of said heater to successively receive the spirals passing from the heater, the quenching means being disposed to quench the multiple coil spiral between said abutments where the spirals are maintained in separated relation to facilitate passage of the quenching medium between the spirals.

7. An apparatus of the class described comprising means for rotatably supporting a multiple coil spiral and separating the spirals thereof axially and maintaining them in separated spiral strip relation as they are rotated and advanced, a first induction heater coil through which the advancing spiraled strip is passed while the spirals thereof are rotated, a quenching means disposed at the rear of said first induction heater to successively receive the spirals discharged from the first induction heater, a supporting means for the spirals disposed at the rear of said first quenching means, a second induction heater coil through which the spirals are axially passed while supported by said supporting means, and a second quenching means at the rear of said second induction heater successively receiving the spirals of the rotating spiral strip.

8. An apparatus of the class described comprising means for rotatably supporting a multiple coil spiral and separating the spirals thereof axially and maintaining them in separated spiral strip relation as they are rotated and advanced, a first induction heater coil through which the advancing spiraled strip is passed while the spirals thereof are rotated, a quenching means disposed at the rear of said first induction heater to successively receive the spirals discharged from the first induction heater, a second induction heater coil through which the spirals are passed, and a second quenching means at the rear of said second induction heater successively receiving the spirals of the rotating spiral strip, said first induction heater coil being disposed to encircle the strip of the multiple coil spiral by extending interiorly of the multiple coil spiral and between adjacent coils thereof.

9. An apparatus of the class described comprising means for rotatably supporting a multiple coil spiral and separating the spirals thereof axially and maintaining them in separated spiral strip relation as they are rotated and advanced, a first heater through which the advancing spiraled strip is passed while the spirals thereof are rotated, a quenching means disposed at the rear of said heater to successively receive the spirals discharged from the first heater, a second heater through which the spirals are passed, and a second quenching means at the rear of said second heater successively receiving the spirals of the rotating spiral strip.

10. An apparatus of the class described comprising means for supporting a multiple coil spiral of ribbon steel coiled edgewise, an induction heater coil disposed with its axis substantially parallel and substantially coincident with the axis of the multiple coil spiral and disposed with the coils thereof radially spaced from but closely adjacent to the coils of the multiple coil spiral to facilitate inductive action of the induction coil substantially entirely in the peripheral portion of the multiple coil spiral, means for relatively axially advancing said multiple coil spiral and said induction coil, means for separating the spirals of the multiple coil spiral into laterally spaced relation, and a quenching means disposed to quench the multiple coil spiral where the spirals thereof are laterally separated from each other and as the same is axially relatively discharged from the inductive action of the induction coil.

HAROLD P. PHILLIPS.

REFERENCES CITED

The following references are of record in the file of this patent:

UNITED STATES PATENTS

| Number | Name | Date |
| --- | --- | --- |
| 1,302,843 | Peirce | May 6, 1919 |
| 1,450,346 | Anderson | Apr. 3, 1923 |
| 1,607,675 | Jeffries | Nov. 23, 1926 |
| 1,732,244 | Salzman | Oct. 22, 1929 |
| 1,872,713 | Fahrenwald | Aug. 23, 1932 |
| 1,937,420 | Wood et al. | Nov. 28, 1933 |
| 2,040,767 | Dudley | May 12, 1936 |
| 2,041,029 | Stargardter | May 19, 1936 |
| 2,059,976 | Stargardter | Nov. 3, 1936 |
| 2,329,188 | Denneen et al. | Sept. 14, 1943 |